United States Patent
Ybarra et al.

(10) Patent No.: US 9,164,694 B1
(45) Date of Patent: Oct. 20, 2015

(54) DATA STORAGE DEVICE DETECTING READ-BEFORE-WRITE CONDITIONS AND RETURNING CONFIGURABLE RETURN DATA

(71) Applicant: Western Digital Technologies, Inc., Irvine, CA (US)

(72) Inventors: Danny O. Ybarra, Mission Viejo, CA (US); Asif F. Gosla, Irvine, CA (US); Virgil V. Wilkins, Perris, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 185 days.

(21) Appl. No.: 13/922,099

(22) Filed: Jun. 19, 2013

(51) Int. Cl.
*G06F 12/10* (2006.01)
*G06F 3/06* (2006.01)
*G06F 12/14* (2006.01)

(52) U.S. Cl.
CPC .......... *G06F 3/0652* (2013.01); *G06F 12/1408* (2013.01)

(58) Field of Classification Search
CPC ..... G06F 12/1408; G06F 3/0652; H04L 9/08; H04L 9/00
USPC ........... 711/103, 163, 166, E12.092, E12.008
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |

(Continued)

Primary Examiner — Pierre-Michel Bataille

(57) ABSTRACT

Disclosed herein is a data storage device comprising data storage media comprising a plurality of data sectors and control circuitry programmed to: receive a command from a host to cryptographically erase at least a portion of data stored on the data storage media; execute a cryptographic erase; receive a read command from the host to read a data sector in the data storage media; determine if the data sector has been cryptographically erased; and return configurable return data to the host in response to determining that the data sector has been cryptographically erased.

18 Claims, 5 Drawing Sheets

(56) References Cited

U.S. PATENT DOCUMENTS

| | | |
|---|---|---|
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |

(56) References Cited

U.S. PATENT DOCUMENTS

| | | |
|---|---|---|
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,512,812 B2 | 3/2009 | Sohn |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,171,282 B2 | 5/2012 | Amann et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |

(56) References Cited

U.S. PATENT DOCUMENTS

| | | | | |
|---|---|---|---|---|
| 8,285,923 | B2 | 10/2012 | Stevens | |
| 8,289,656 | B1 | 10/2012 | Huber | |
| 8,305,705 | B1 | 11/2012 | Roohr | |
| 8,307,156 | B1 | 11/2012 | Codilian et al. | |
| 8,310,775 | B1 | 11/2012 | Boguslawski et al. | |
| 8,315,006 | B1 | 11/2012 | Chahwan et al. | |
| 8,316,263 | B1 | 11/2012 | Gough et al. | |
| 8,320,067 | B1 | 11/2012 | Tsai et al. | |
| 8,324,974 | B1 | 12/2012 | Bennett | |
| 8,332,695 | B2 | 12/2012 | Dalphy et al. | |
| 8,341,337 | B1 | 12/2012 | Ong et al. | |
| 8,347,110 | B2 * | 1/2013 | Pelletier et al. | 713/189 |
| 8,350,628 | B1 | 1/2013 | Bennett | |
| 8,356,184 | B1 | 1/2013 | Meyer et al. | |
| 8,370,683 | B1 | 2/2013 | Ryan et al. | |
| 8,375,225 | B1 | 2/2013 | Ybarra | |
| 8,375,274 | B1 | 2/2013 | Bonke | |
| 8,380,922 | B1 | 2/2013 | DeForest et al. | |
| 8,390,948 | B2 | 3/2013 | Hogg | |
| 8,390,952 | B1 | 3/2013 | Szeremeta | |
| 8,392,689 | B1 | 3/2013 | Lott | |
| 8,407,393 | B1 | 3/2013 | Yolar et al. | |
| 8,413,010 | B1 | 4/2013 | Vasquez et al. | |
| 8,417,566 | B2 | 4/2013 | Price et al. | |
| 8,421,663 | B1 | 4/2013 | Bennett | |
| 8,422,172 | B1 | 4/2013 | Dakroub et al. | |
| 8,427,771 | B1 | 4/2013 | Tsai | |
| 8,429,343 | B1 | 4/2013 | Tsai | |
| 8,433,937 | B1 | 4/2013 | Wheelock et al. | |
| 8,433,977 | B1 | 4/2013 | Vasquez et al. | |
| 8,458,526 | B2 | 6/2013 | Dalphy et al. | |
| 8,462,466 | B2 | 6/2013 | Huber | |
| 8,467,151 | B1 | 6/2013 | Huber | |
| 8,489,841 | B1 | 7/2013 | Strecke et al. | |
| 8,493,679 | B1 | 7/2013 | Boguslawski et al. | |
| 8,498,074 | B1 | 7/2013 | Mobley et al. | |
| 8,499,198 | B1 | 7/2013 | Messenger et al. | |
| 8,512,049 | B1 | 8/2013 | Huber et al. | |
| 8,514,506 | B1 | 8/2013 | Li et al. | |
| 8,531,791 | B1 | 9/2013 | Reid et al. | |
| 8,554,741 | B1 | 10/2013 | Malina | |
| 8,560,759 | B1 | 10/2013 | Boyle et al. | |
| 8,565,053 | B1 | 10/2013 | Chung | |
| 8,576,511 | B1 | 11/2013 | Coker et al. | |
| 8,578,100 | B1 | 11/2013 | Huynh et al. | |
| 8,578,242 | B1 | 11/2013 | Burton et al. | |
| 8,589,773 | B1 | 11/2013 | Wang et al. | |
| 8,593,753 | B1 | 11/2013 | Anderson | |
| 8,595,432 | B1 | 11/2013 | Vinson et al. | |
| 8,599,510 | B1 | 12/2013 | Fallone | |
| 8,601,248 | B2 | 12/2013 | Thorsted | |
| 8,611,032 | B2 | 12/2013 | Champion et al. | |
| 8,612,650 | B1 | 12/2013 | Carrie et al. | |
| 8,612,706 | B1 | 12/2013 | Madril et al. | |
| 8,612,798 | B1 | 12/2013 | Tsai | |
| 8,619,383 | B1 | 12/2013 | Jung et al. | |
| 8,621,115 | B1 | 12/2013 | Bombet et al. | |
| 8,621,133 | B1 | 12/2013 | Boyle | |
| 8,626,463 | B2 | 1/2014 | Stevens et al. | |
| 8,630,052 | B1 | 1/2014 | Jung et al. | |
| 8,630,056 | B1 | 1/2014 | Ong | |
| 8,631,188 | B1 | 1/2014 | Heath et al. | |
| 8,634,158 | B1 | 1/2014 | Chahwan et al. | |
| 8,635,412 | B1 | 1/2014 | Wilshire | |
| 8,640,007 | B1 | 1/2014 | Schulze | |
| 8,654,619 | B1 | 2/2014 | Cheng | |
| 8,661,193 | B1 | 2/2014 | Cobos et al. | |
| 8,667,248 | B1 | 3/2014 | Neppalli | |
| 8,670,205 | B1 | 3/2014 | Malina et al. | |
| 8,683,295 | B1 | 3/2014 | Syu et al. | |
| 8,683,457 | B1 | 3/2014 | Hughes et al. | |
| 8,687,306 | B1 | 4/2014 | Coker et al. | |
| 8,693,133 | B1 | 4/2014 | Lee et al. | |
| 8,694,841 | B1 | 4/2014 | Chung et al. | |
| 8,838,950 | B2 * | 9/2014 | Craft et al. | 713/100 |
| 8,909,942 | B1 * | 12/2014 | Obukhov et al. | 713/193 |
| 2006/0053288 | A1 * | 3/2006 | Stern et al. | 713/168 |
| 2008/0155275 | A1 * | 6/2008 | Natarajan et al. | 713/193 |
| 2009/0113702 | A1 | 5/2009 | Hogg | |
| 2009/0327818 | A1 | 12/2009 | Kogelnik | |
| 2010/0131773 | A1 * | 5/2010 | Cherian et al. | 713/193 |
| 2010/0306551 | A1 | 12/2010 | Meyer et al. | |
| 2011/0226729 | A1 | 9/2011 | Hogg | |
| 2012/0093318 | A1 | 4/2012 | Obukhov et al. | |
| 2012/0159042 | A1 | 6/2012 | Lott et al. | |
| 2012/0275050 | A1 | 11/2012 | Wilson et al. | |
| 2012/0281963 | A1 | 11/2012 | Krapf et al. | |
| 2012/0324980 | A1 | 12/2012 | Nguyen et al. | |

* cited by examiner

| Normal Read Scenario |
|---|
| Accessed a VALID Physical Block |
| Accessed a VALID Logical Block (Pre-Decryption Check) |
| No HW Decryption Errors Detected |
| Accessed a VALID Logical Block (Post-Decryption Check) |

FIG. 3A

| "VALID" Read-Before-Write Scenario |
|---|
| Accessed a VALID Physical Block |
| Accessed a VALID Logical Block (Pre-Decryption Check) |
| No HW Decryption Errors Detected |
| Accessed an INVALID Logical Block (Post-Decryption Check) |

FIG. 3B

| Read Error Scenario |
|---|
| Accessed a VALID Physical Block |
| Accessed a VALID Logical Block (Pre-Decryption Check) |
| Detected A HW Decryption Error |
| Accessed an INVALID Logical Block (Post-Decryption Check) |

FIG. 3C

DATA STORAGE DEVICE DETECTING READ-BEFORE-WRITE CONDITIONS AND RETURNING CONFIGURABLE RETURN DATA

BACKGROUND

Certain data storage devices may support a cryptographic erase feature whereby data is encrypted with a key and rendered inaccessible (effectively erased) by deleting the key used for such encryption.

BRIEF DESCRIPTION OF THE DRAWINGS

FIGS. 3A-3C illustrate various data processing scenarios including the read-before-write scenario according to an embodiment.

DETAILED DESCRIPTION

Figure 1A:
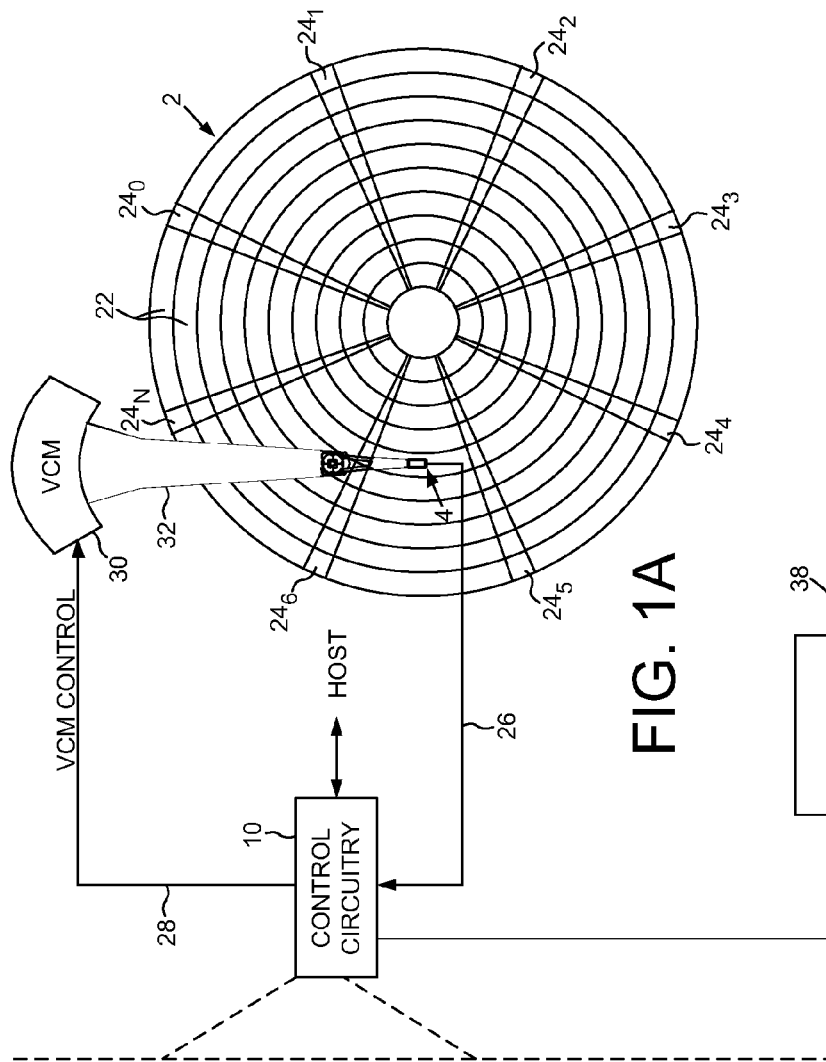
FIG. 1A shows a data storage device according to an embodiment.

FIG. 1A shows a data storage device 8 according to an embodiment. In an embodiment, the data storage device 8 comprises magnetic recording media such as a disk 2 comprising a plurality of servo tracks 22 defined by servo sectors $24_0$-$24_N$, a head 4 actuated over the disk 2, and control circuitry 10 comprising a servo control system operable to servo the head 4 over the disk 2. In the embodiment of FIG. 1A, the control circuitry 24 processes a read signal 26 emanating from the head 4 to demodulate the servo sectors $24_0$-$24_N$ and generate a position error signal (PES) representing an error between the actual position of the head and a target position relative to a target track. The control circuitry 10 filters the PES using a suitable compensation filter to generate a control signal 28 applied to a voice coil motor (VCM) 30 which rotates an actuator arm 32 about a pivot in order to actuate the head 4 radially over the disk 2 in a direction that reduces the PES. The servo sectors $24_0$-$24_N$ may comprise any suitable head position information, such as a track address for coarse positioning and servo bursts for fine positioning. The servo bursts may comprise any suitable pattern, such as an amplitude based servo pattern or a phase based servo pattern.

In another embodiment, the control circuitry 10 is configured to read data from, and write data to, a solid-state memory media 38, either in addition to, or in place of, magnetic recording media such as disk 2. Thus, the data storage device 8 may comprise one or more of: (1) the disk 2 and the associated servo-mechanical system and (2) the solid-state memory 38 and the associated circuitry.

Figure 1B:
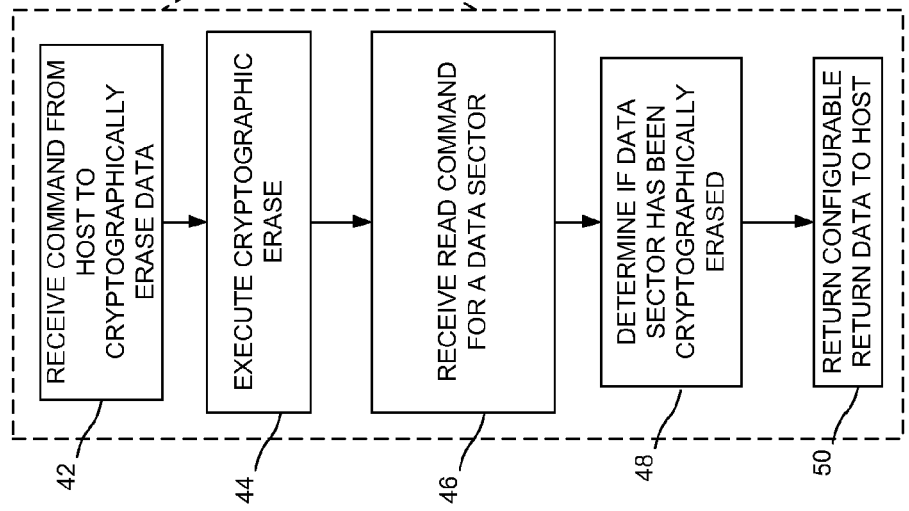
FIG. 1B is a flow diagram showing a method executed by the control circuitry of the data storage device according to an embodiment.

In an embodiment, the control circuitry 10 is operable to execute the method shown in the flow diagram of FIG. 1B. At block 42, a command is received from a host to cryptographically erase at least a portion of data stored on the data storage media (e.g., disk 2 or solid state memory 38). The cryptographic erase command may result in the cryptographic erasure of all user data in the data storage device. At block 44, in response to the host command, a cryptographic erase is executed in the data storage device. At block 46, a read command from the host to read a data sector is received by the data storage device. At block 48, it is determined if the requested data sector has been cryptographically erased. At block 50, configurable return data is returned to the host in response to determining that the data sector has been cryptographically erased. This situation in which cryptographic erased data is requested in a read command before it is overwritten is referred to as a "read-before-write" condition.

In an embodiment, the control circuitry is further programmed to decrypt data stored in the data sector based on a key and determine that the data sector has been cryptographically erased when the decryption fails. As will be explained further below in conjunction with FIGS. 3A-3C and 4, when the key has been invalidated and no hardware error has been detected, this constitutes a read-before-write condition.

The configurable return data that is returned to the host may take on several forms in various embodiments. In an embodiment, the control circuitry is configured to return scrambled data as the configurable return data. The scrambled data may be generated by decrypting data written to the data sector with a different key than the key used for encryption just prior to writing the data to the data sector. In another embodiment, the configurable return data may include a data path protection tag that identifies the returned data as configurable return data instead of user data read from the data sector. The data path protection tag may be defined according to a standard such as the Small Computer System Interface (SCSI) T10 standard, and the tag may include SCSI T10 protection information.

Figure 2:
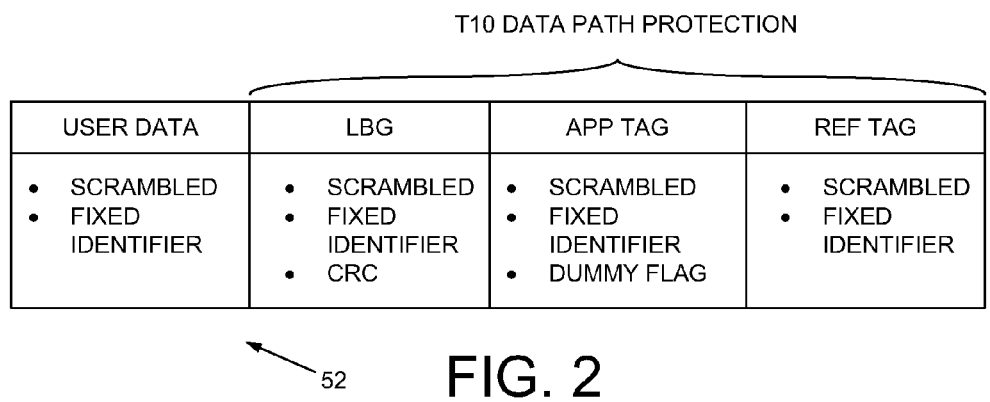
FIG. 2 illustrates example data path protection information according to an embodiment.

FIG. 2 illustrates example data path protection information according to an embodiment. As shown in table 52, each field (user data, logical block guard (LBG), application tag, and reference tag) may include several configurable options. For example, in the user data field, configurable return data may be configured such that either scrambled data or a fixed identifier is returned as the "user data" when a cryptographic erase condition is encountered. Similarly, configurable return data may be configured such that scrambled data, a fixed identifier, or CRC information may be returned under the LBG field. The same could be configured for the other fields shown and so on. The various options under each field can be combined, so that the configurable return data can be highly customizable to suit the expectation of the host. In an embodiment, the configurable return data may be configured so that the host can discern, through the configurable return data, that a read-before-write condition has occurred, and take appropriate error handling actions. The individual options may also indicate to the host additional identifying information such as drive identifier, sector identifier, etc. to aid in the error handling actions. In some embodiments, the configurable return data may be configured to meet backward compatibility requirements of the host system.

FIGS. 3A-3C illustrate various data processing scenarios including the read-before-write scenario according to an embodiment. FIG. 3A illustrates a normal read scenario. Under this scenario, first, when the data is read from the media, a check indicates a valid physical block of data has been accessed. Second, another check indicates a valid logical block of data has been accessed. This logical block check is typically performed pre-decryption. Third, another check indicates that no hardware decryption error has been detected during the decryption process. Finally, a post-decryption logical block check also verifies that a valid logical block has been accessed. When these checks indicate that these conditions are verified, the data retrieved from the media (user data) is returned to the host as part of a normal read operation.

In the read-before-write scenario shown in FIG. 3B, the physical block, logical block, and hardware decryption condition check results are identical to the normal read scenario. However, the post-decryption logical block check indicates that an invalid logical block has been accessed. In an embodiment, an error detection code (EDC) is seeded with a logical block address at the time of writing, and that EDC does not verify correctly post-decryption, indicating that an error has occurred. This could occur, if a cryptographic erase has taken place between initial writing and the read, and as a result the key used to encrypt the original data is no longer available for decryption. This read-before-write scenario is contrasted with a normal read error scenario shown in FIG. 3C, where, in addition to the failed logical block check post-decryption, a hardware decryption error has also been detected.

Figure 4:
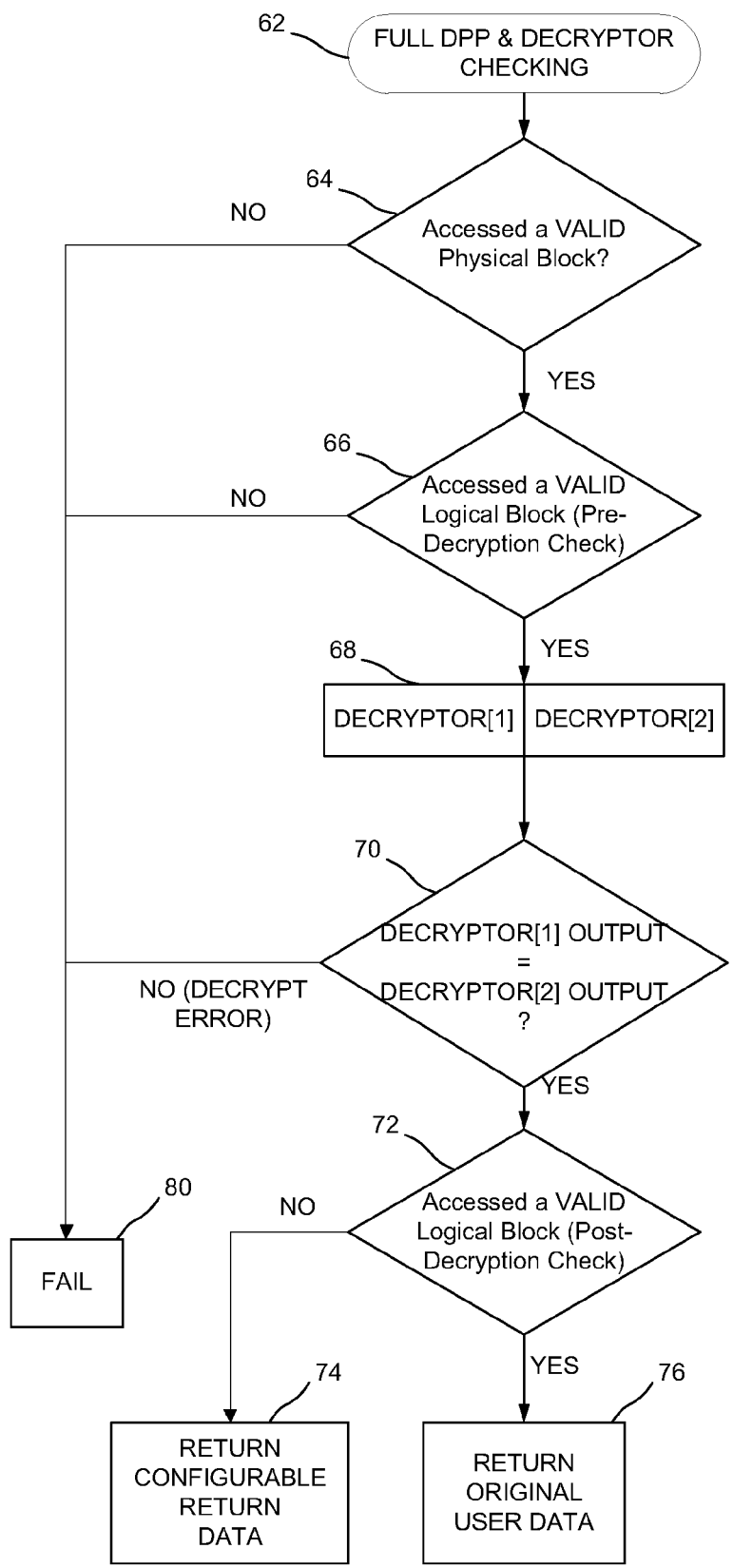
FIG. 4 is a flow chart illustrating a method of reading data from the data storage device and performing various related checks according to an embodiment.

FIG. 4 is a flow chart illustrating a method of reading data from the data storage device and performing various related checks according to an embodiment. In an embodiment, the data path protection and decryptor checking method 62 is performed by the control circuitry 10 of the data storage device 8. The method 62 in an embodiment is performed as part of a read operation in a data storage device that implements encryption. At block 64, the control circuitry checks whether it has accessed a valid physical block of data. In an embodiment, this check includes checking an EDC that was PBA (physical block address) seeded at the time of writing to see if the recovered PBA matches the expected value. If not, the method ends at the failure block 80, where an error handling mechanism may be triggered. Otherwise, an additional check is performed to determine whether the valid logical block of data has been read. This may include checking whether an EDC that was LBA seeded at the time of writing verifies correctly. If the check fails, again the method ends at the failure block 80.

Otherwise, if the check at block 66 verifies correctly, a dual decryptor is used at block 68 in an embodiment, and the results from both decryptors are compared to each other at block 70 to ensure that the decryption executed properly. The use of a dual decryptor in an embodiment enables a high-confidence confirmation of a good decryption without errors. This aids in the detection of a read-before-write condition by distinguishing a scenario that is caused by a hardware decryption error from one caused by a key change. If no decryption error is detected, then at block 72 an additional check is performed. In an embodiment, this check includes checking an EDC that was LBA seeded at the time of writing to see if the recovered LBA post decryption matches the expected value. If the check verifies correctly, this means that a cryptographic erase has not taken place. Finally, the read data is returned to the host at block 76. If an error is found at block 72, a read-before-write condition has been detected and configurable return data is returned to the host as described above.

Figure 5:
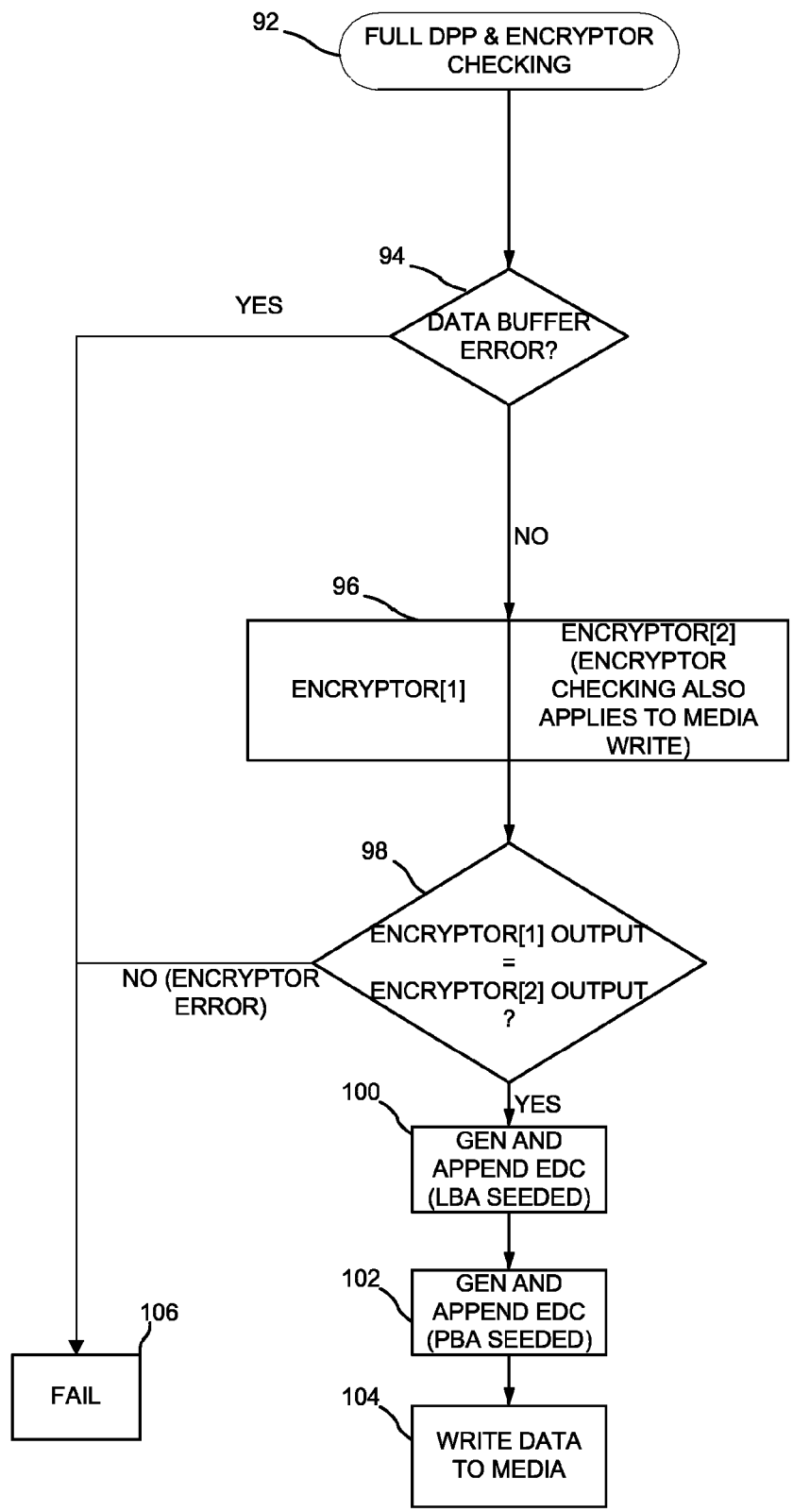
FIG. 5 is a flow chart illustrating a method of writing data to the data storage device and performing various related checks according to an embodiment.

FIG. 5 is a flow chart illustrating a method of writing data to the data storage device and performing various related checks according to an embodiment. In an embodiment, the data path protection and encryptor checking method 92 is performed by the control circuitry 10 of the data storage device 8. The method 92 in an embodiment is performed as part of a write operation in a data storage device that implements encryption, and may be complementary to the method 62 shown in FIG. 4. At block 94, the control circuitry checks whether a data buffer error has been encountered. The check includes checking error detection code (EDC) data as the data is read from the buffer in anticipation of writing to the media.

In one embodiment, the same EDC is carried with the data to be written throughout the remainder of the process. If the check fails, the method ends at the failure block 106, where an error handling mechanism may be triggered. If the check at block 94 verifies correctly, a dual encryptor is used at block 96, and the results from both encryptors are compared to each other at block 98 to ensure that the encryption executed properly. The use of a dual encryptor in an embodiment enables a high-confidence confirmation of a good encryption without errors. If no encryption error is detected, then at block 100 an LBA seeded EDC is generated and appended to the data. Then, at block 102 an PBA seeded EDC is generated and appended to the data. The data, with the appended EDC information, are then written to the media in block 104.

Those skilled in the art will appreciate that in some embodiments, other types of data storage devices can be implemented. In addition, the actual steps taken in the processes shown in FIGS. 1B, 4, and 5 may differ from those shown in the figures. Depending on the embodiment, certain of the steps described above may be removed, others may be added. While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made.

The accompanying claims and their equivalents are intended to cover such forms or modifications as would fall within the scope and spirit of the protection. For example, the various components illustrated in the figures may be implemented as software and/or firmware executed by a processor, ASIC/FPGA, or dedicated hardware. For example, the actions described as performed by the control circuitry could be implemented as being performed by software and/or firmware executed by a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage device comprising:
   data storage media comprising a plurality of data sectors; and
   control circuitry programmed to:
   receive a command from a host to cryptographically erase at least a portion of data stored on the data storage media;
   execute a cryptographic erase;
   receive a read command from the host to read a data sector in the data storage media, wherein the read command comprises a logical block address (LBA);
   map the LBA to a physical block address (PBA) representing the data sector;
   use the PBA to read the data sector from the storage media to generate read data;
   decrypt the read data to generate decrypted read data;
   execute a data path protection check on the decrypted read data using at least one of the LBA and the PBA;

when the data path protection check fails, determine that the data sector has been cryptographically erased; and return configurable return data to the host in response to determining that the data sector has been cryptographically erased.

2. The data storage device as recited in claim 1, wherein the control circuitry is further programmed to:

decrypt data stored in the data sector based on a key; and determine that the data sector has been cryptographically erased when a read-before-write condition is detected.

3. The data storage device as recited in claim 2, wherein the read-before-write condition is detected when the key has been invalidated and no hardware error has been detected.

4. The data storage device as recited in claim 1, wherein the configurable return data comprises scrambled data.

5. The data storage device as recited in claim 4, wherein the control circuitry is further configured to generated the scrambled data by decrypting data written to the data sector with a different key than the one used for encryption prior to writing the data to the data sector.

6. The data storage device as recited in claim 1, wherein the control circuitry is further configured to return a data path protection tag that identifies the returned data as configurable return data instead of data read from the data sector.

7. The data storage device as recited in claim 6, wherein the data storage device supports a Small Computer System Interface (SCSI) and the data path protection tag comprises SCSI T10 protection information.

8. The data storage device as recited in claim 1, wherein the data storage media comprises at least one of:

magnetic recording media; and solid-state non-volatile memory media.

9. The data storage device as recited in claim 1, wherein the data path protection check comprises generating an error detection code (EDC) over at least part of the decrypted read data based on the LBA received in the read command.

10. A method for managing data in a data storage device that comprises data storage media comprising a plurality of data sectors, the method comprising:

receiving a command from a host to cryptographically erase at least a portion of data stored on the data storage media;

executing a cryptographic erase;

receiving a read command from the host to read a data sector in the data storage media, wherein the read command comprises a logical block address (LBA);

mapping the LBA to a physical block address (PBA) representing the data sector;

using the PBA to read the data sector from the storage media to generate read data;

decrypting the read data to generate decrypted read data;

executing a data path protection check on the decrypted read data using at least one of the LBA and the PBA;

when the data path protection check fails, determining that the data sector has been cryptographically erased; and returning configurable return data to the host in response to determining that the data sector has been cryptographically erased.

11. The method as recited in claim 10, further comprising:

decrypting data stored in the data sector based on a key; and determining that the data sector has been cryptographically erased when a read-before-write condition is detected.

12. The method as recited in claim 11, wherein the read-before-write condition is detected when the key has been invalidated and no hardware error has been detected.

13. The method as recited in claim 10, wherein the configurable return data comprises scrambled data.

14. The method as recited in claim 13, further comprising generating the scrambled data by decrypting data written to the data sector with a different key than the one used for encryption prior to writing the data to the data sector.

15. The method as recited in claim 10, wherein returning the configurable return data comprises returning a data path protection tag that identifies the returned data as configurable return data instead of data read from the data sector.

16. The method as recited in claim 15, wherein the data storage device supports a Small Computer System Interface (SCSI) and the data path protection tag comprises SCSI T10 protection information.

17. The method as recited in claim 10, wherein the data storage media comprises at least one of:

magnetic recording media; and solid-state non-volatile memory media.

18. The method as recited in claim 10, wherein the data path protection check comprises generating an error detection code (EDC) over at least part of the decrypted read data based on the LBA received in the read command.

* * * * *